Figure 1:
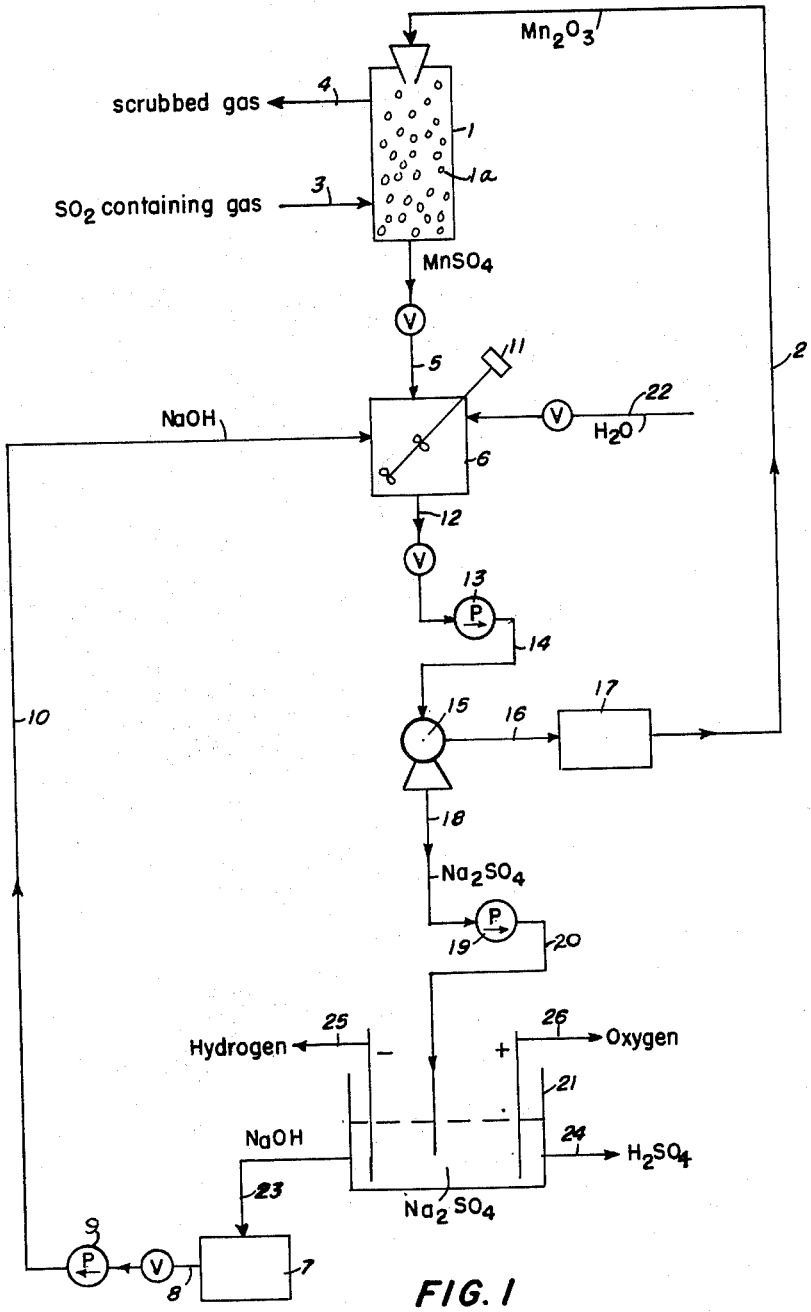

INVENTORS
**DANIEL BIENSTOCK
JOSEPH H. FIELD**

BY Ernest F. Cohen
William S. Brown
ATTORNEYS

United States Patent Office 3,150,923
Patented Sept. 29, 1964

3,150,923
PROCESS FOR REMOVING SULFUR DIOXIDE
FROM GASES
Daniel Bienstock and Joseph H. Field, Pittsburgh, Pa.,
assignors to the United States of America as represented
by the Secretary of the Interior
Filed Jan. 18, 1962, Ser. No. 167,198
8 Claims. (Cl. 23—2)
(Granted under Title 35, U.S. Code (1952), sec. 266)

The invention herein described and claimed may be manufactured and used by or for the Government of the United States of America for governmental purposes without payment of royalties thereon or therefor.

This invention relates to an improved process for the removal of oxides of sulfur from waste gases. Sulfur dioxide is a constituent of many waste gases such as smelter gases, flue gases, offgases from chemical processes and stack gases from coal-burning furnaces. Contamination of the atmosphere by sulfur dioxide, whether present in dilute concentration of 0.05 to 0.3 volume percent as in power plant flue gases or in higher amounts of 5 to 10 percent as in ore roaster gases, has been a public health problem for many years due to its irritating effect on the respiratory system, its adverse effect on plant life and its corrosive attack on may metals, fabrics and building materials. It is estimated that 21 million tons of sulfur dioxide are emitted into the atmosphere each year in the United States due to the combustion of fuel oil and coal. Of this amount about 40 percent is produced in the generation of electric power.

Many methods have been proposed for removing sulfur dioxide from waste gases. Processes based upon catalytic oxidation of sulfur dioxide to sulfur trioxide and formation of sulfuric acid by reaction with water have been described. Other proposed processes employ absorbent materials such as chalk, carbonaceous materials and alkaline materials, usually in aqueous suspension. U.S. Patent 2,984,545 discloses the use of a mixture of manganese dioxide and lower oxides of manganese in aqueous suspension for absorption of sulfur dioxide followed by calcination of the thus formed manganese sulfate to regenerate manganese oxide. U.S. Patent No. 2,992,884 discloses the use of an alkali metal oxide on an alumina or chromia support for absorption of sulfur dioxide followed by regeneration by treatment with a hot reducing gas.

Many of the prior art processes are, however, inefficient when the concentration of the sulfur dioxide in the waste gas is less than 1 percent. Although the percent of sulfur dioxide in such gases is small, the total quantity of sulfur dioxide may be very large. Another objection to many prior art processes is the lack of provision for a practical method for the recovery of the sulfur dioxide in useable form as well as for regeneration of the absorbent material.

A still further objection to prior art processes employing liquid phase absorption techniques is that such processes act to cool the treated gas which subsequently has a higher density and tends to settle in the vicinity of the stack. As a result local pollution may become worse, even though the amount of sulfur compounds emitted to the atmosphere is reduced.

It is accordingly an object of this invention to provide a process for the recovery of sulfur oxides from waste gases containing sulfur oxides wherein recovery of the sulfur oxides is substantially complete.

Another object is to provide a process which is capable of recovering sulfur dioxide in a commerically useful and saleable form and permits ready regeneration of the absorbent material.

Still another object is to provide a process in which the sulfur dioxide is removed from waste gas with a minimum of cooling of the gas.

A still further object is to provide such a process which is simple, dependable and in which equipment costs are low.

Other objects and adavantages of our invention will become apparent as the disclosure proceeds.

According to the present invention these objects are attained by a process which comprises separation of sulfur dioxide from waste gases by contacting the waste gases with an absorbent material comprising solid manganese oxide. The reaction of the sulfur dioxide in the waste gases with the manganese oxide results in the formation of manganese sulfate which is then treated to regenerate the manganese oxide. By means of such a process the sulfur dioxide is removed from the waste gases without effecting cooling of the waste gases thus avoiding the undesirable effects of cooling referred to above.

Following the absorption of the sulfur dioxide by the manganese oxide, the spent absorbent, manganese sulfate, is treated to regenerate the manganese oxide. Various methods may be employed for the regeneration. According to one method, the spent absorbent is oxidized with ammonium persulfate according to the following equation:

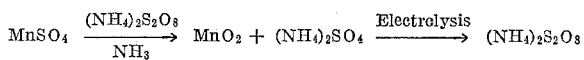

$$\downarrow$$

Excess as by-product

Manganese oxide, prepared as above, although quite effective as an absorbent, would be uneconomical to regenerate on a large scale continuous basis since ammonia is required as a raw material while ammonium sulfate is the end product. The production of ammonium sulfate by this technique from only 20 power plants of 120,000 kw. capacity would supply all the requirements of ammonium sulfate in this country. Thus in a very short while disposal of ammonium sulfate on the commercial market would be difficult.

A second method of regeneration involves treatment of the spent absorbent with sodium carbonate according to the following equation:

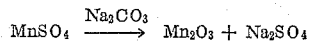

This process is also uneconomical since sodium carbonate is required as a raw material with sodium sulfate as end product.

A third method of regeneration involves direct electrolysis of the spent absorbent. However, in such a process the following technical problems occur: (1) Manganous hydroxide forms at the cathode as a gelatinous deposit. The deposit is a poor conductor of electricity and causes a decrease in current density. This difficulty may be overcome by increasing the potential difference between the electrode, by mechanically removing the deposit or by diverting some of the sulfuric acid formed at the anodes to the cathode region, maintaining a pH low enough to prevent formation of manganous hydroxide. (2) Two types of manganese oxide are recovered from the cell, manganese dioxide from the anode and managanic oxide ($Mn_2O_3$) by air oxidation of manganous hydroxide from the cathode. The cathode product is of considerably lower activity as an absorbent than that from the anode. (3) Contamination of the sulfuric acid product with manganese.

A fourth and preferred method of regeneration comprises treatment of the spent absorbent with sodium hydroxide, filtering and electrolysis of the filtrate to recover sodium hydroxide for reuse in the regeneration step and to produce sulfuric acid as a by-product.

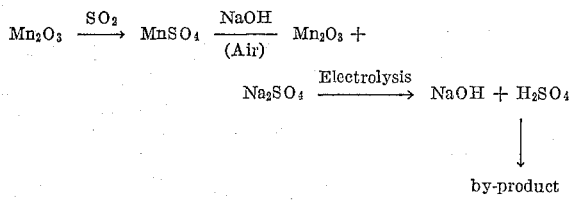

With this method there is no precipitate formed during electrolysis, thus simplifying the mechanics of electrolysis and recovering a pure sulfuric acid as by-product.

Although all four processes are technically feasible, the fourth is most attractive commercially and is therefore the preferred technique. Regeneration by thermal decomposition of manganese sulfate at 1000° C. as disclosed in Patent No. 2,984,545, while effective in the aqueous slurry process of the patent, produces an inactive absorbent which does not absorb sulfur dioxide at 130° C. in applicants' solid phase process.

The invention will be more completely understood by considering the schematic drawing in FIGURE 1 which is a flow sheet illustrating diagrammatically one process utilizing the principles of our invention. As shown therein, 1 is an absorption vessel or absorber which contains hot solid manganese oxide 1a. The latter is introduced in vessel 1 as a falling bed through line 2, which may be a gas lift, bucket elevator, screw conveyor, etc. Flue gas is introduced into the bottom of the absorber via line 3 and passes upward through the absorber 1, countercurrent to the downwardly moving bed of absorbent. Scrubbed flue gas with substantially all sulfur dioxide removed or only an insignificant amount left, is removed from the absorber by line 4 for heat exchange with incoming air for combustion or venting to the atmosphere through a stack. Spent absorbent leaves the bottom of absorber 1 through line 5 to mixing vat 6.

A solution of sodium hydroxide from storage vat 7 is pumped from line 8 to mixing vat 6 via line 10 by pump 9. The mixture in vat 6 is mechanically stirred by mixer 11 and a slurry is removed from vat 6 by line 12 and pump 13 to filter press 15 via line 14. The solid residue from filter press 15 is transferred through line 16 to granulator 17, then by lift or elevator via line 2 to absorber 1. The filtrate from filter press 15 is pumped from line 18 to the electrolytic cell 21 via line 20 by pump 19. To maintain proper concentration of solutions, water is admitted to vat 6 via line 22. Oxygen generated by electrolysis is removed via line 26, hydrogen by line 25. Sodium hydroxide flows to storage vat 7 via line 23, and sulfuric acid is pumped via line 24 for further purification and concentration.

The following examples will illustrate applicants' method of absorbing $SO_2$ and regeneration of the spent absorbent.

EXAMPLE I

The absorbent was prepared as follows: To a 30 percent solution of manganese sulfate a 25 percent solution of sodium hydroxide was added in an amount equal to 20% excess (stoichiometric) of sodium hydroxide. Both solutions were heated to 70° C. before mixing. The mixture was stirred, filtered and twice washed with cold water, filtering after each washing. The precipitate was dried at 108° C. for 47 hours, heated with air for 2 hours at 300° C. and then in vacuo at 300°–340° C. for 20 hours. The analysis of the thus prepared absorbent was as follows.

| Component: | Weight percent |
|---|---|
| $Mn_2O_3$ | 99.0 |
| $Na_2O$ | 0.4 |
| $SO_3$ | 0.5 |

The absorbent was treated as a fixed bed with a simulated flue gas of the following composition.

| Component: | Weight percent |
|---|---|
| $SO_2$ | 0.3 |
| $CO_2$ | 13.0 |
| $O_2$ | 6.0 |
| $H_2O$ | 6.7 |
| $N_2$ | 74.0 |
| | 100.0 |

Figure 2:
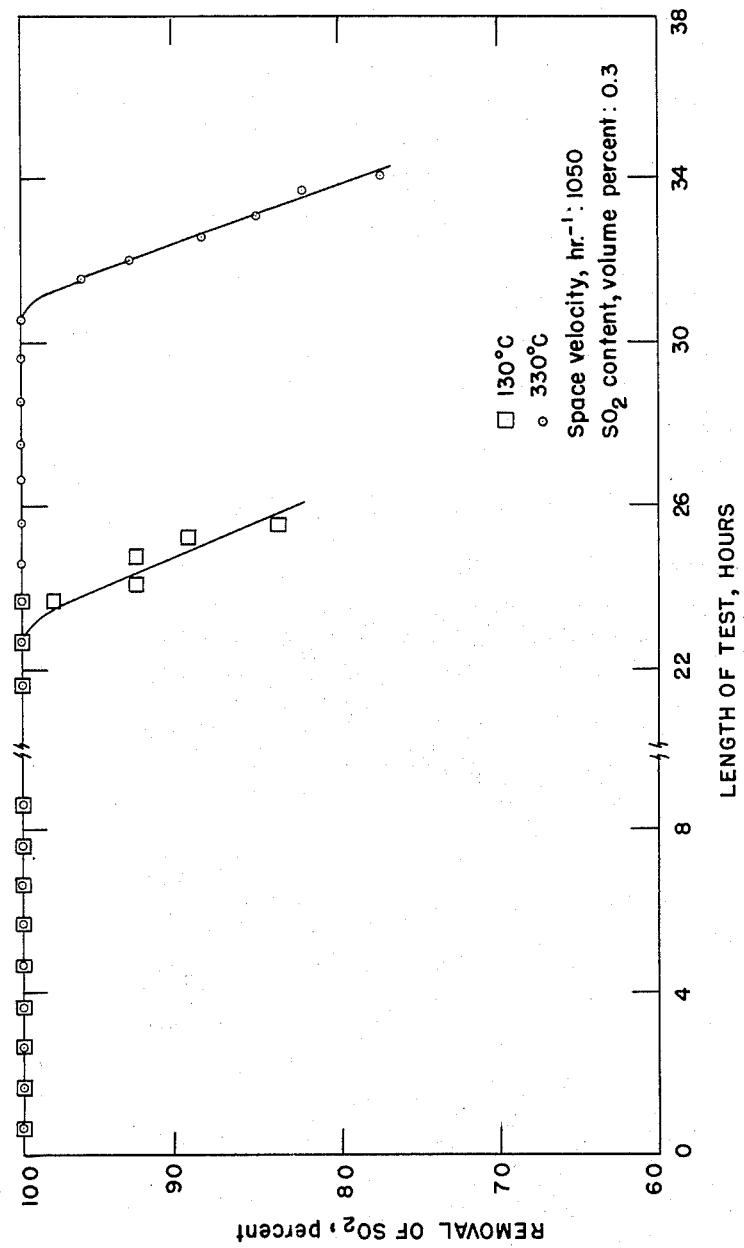

Results of the absorption tests, conducted at 130° C. and 330° C. are plotted in FIGURE 2 and compared with other manganese absorbents in Table 1.

*Table 1.—Manganese Oxides as Absorbents of Sulfur Dioxide*

[Space velocity, hr.$^{-1}$, 1050; $SO_2$ content of gas, volume percent, 0.3; $H_2O$ content of gas, volume percent, 6.7; Mesh size of absorbent, 8–24]

| Preparation | Crystalline phase (X-ray analysis) | Bulk density, g./cm.³ | Absorption at 130° C.[a] | | Absorption at 330° C.[a] | |
|---|---|---|---|---|---|---|
| | | | G. $SO_2$/ 100 g. absorbent | Vol. $SO_2$/ volume absorbent | G. $SO_2$/ 100 g. absorbent | Vol. $SO_2$/ volume absorbent |
| $MnSO_4$ $\xrightarrow{Electrolysis}$ Precipitate at anode, washed, dried, and heated in vacuo at 300°–340° C. | $MnO_{1.88}$ | 0.50 | 23 | 37 | 53 | 83 |
| Precipitate at cathode, washed, dried, heated with air at 300° C. and in vacuo at 300°–340° C. | $\gamma$-$Mn_2O_3$ | .58 | | | 10 | 21 |
| $MnSO_4$ $\xrightarrow{NaOH}$ Precipitate washed, dried, heated with air at 300° C. and in vacuo at 300°–340° C. | $\gamma$-$Mn_2O_3$ | .66 | 33 | 75 | 43 | 100 |
| $MnSO_4$ $\xrightarrow{Na_2CO_3}$ Precipitate washed, dried, and heated in vacuo at 300°–340° C. | $\gamma$-$Mn_2O_3$ | .67 | 19 | 45 | 58 | 135 |
| $MnSO_4$ $\xrightarrow{(NH_4)_2S_2O_8}$ (a) Precipitate washed, dried at 130° C. | $MnO_{1.88}$ | .14 | 33 | 16 | | |
| (b) Precipitate washed, dried, and heated in vacuo at 300°–340° C. | $MnO_{1.88}$ | .13 | | | 61 | 28 |

[a] 90 percent removal of sulfur dioxide.

EXAMPLE II

To determine the effect of regeneration on activity, another preparation of the absorbent was made and exposed to the simulated flue gas at 330° C. The spent material was pulverized to 60 mesh and added to a hot 20 percent solution of sodium hydroxide. The sodium hydroxide was present in 20 percent excess of the stoichiometric amount of the sulfur dioxide absorbed. The mixture was stirred, filtered and twice washed with water. The precipitate was filtered, dried at 105° C. for 48 hours, heated with air at 300° C., in vacuo at 300°–330° C. for 20 hours and sieved to 8–24 mesh. The regenerated absorbent was retested with flue gas at 330° C. The results, shown in Table 2, show that the regenerated absorbent had the same activity as the original preparation.

*Table 2.—Effect of Regeneration Upon Activity of a Manganese Oxide*

[Space velocity, hr.$^{-1}$, 1050; SO$_2$ content, volume percent, 0.3; Mesh size of absorbent, 8–24; Temperature of absorbent, ° C., 330]

| Preparation | Bulk density, g./cm.$^3$ | G. SO$_2$ absorbed/ 100 g. absorbent | Vol. SO$_2$ absorbed/ Vol. absorbent |
| --- | --- | --- | --- |
| NaOH<br>c.p. MnSO$_4$ ⟶<br>Precipitate washed, dried, heated with air at 300° C. and in vacuo at 300°–340° C. for 20 hours. | 0.56 | 36.1 | 70.5 |
| NaOH<br>Spent absorbent ⟶<br>Precipitate washed, dried, heated with air at 300° C. and in vacuo at 300°–340° C. for 20 hours. | .71 | 37.0 | 91.4 |

EXAMPLE III

The absorbent was prepared as follows: Twenty-percent solutions of manganese sulfate and ammonium persulfate containing 775 and 1,290 grams respectively were mixed. The mixture was made basic by addition of ammonium hydroxide, and then heated to boiling. The mixture was boiled for 10 minutes while maintaining alkalinity to litmus with further additions of ammonium hydroxide. The mixture was filtered and the precipitate twice washed with cold water with filtering after each washing. The precipitate was then dried at 130° C. for 96 hours and used as absorbent in the test at 130° C. as shown in Table 1. For the test at 330° C. the absorbent was further heated in vacuo at 330°–340° C. for 20 hours. Chemical analyses of the absorbents were as follows:

| Component | Weight-percent | |
| --- | --- | --- |
| | Dried at 130° C. | Dried at 300°–340° C. |
| MnO$_{1.88}$ | 89.9 | 93.7 |
| SO$_3$ | 2.6 | 3.1 |

The composition of the flue gas was identical to that given in Example I. Results of the absorption tests are shown in Table 1.

The spent absorbent, MnSO$_4$, is soluble in water. Preparation and properties of an absorbent made from the spent MnSO$_4$ would be identical to that prepared from a fresh charge of MnSO$_4$.

EXAMPLE IV

The absorbent was prepared as follows: To a 30-percent solution of manganese sulfate, a 25-percent solution of sodium carbonate was added in an amount equal to 20 percent excess (stoichiometric) of sodium carbonate. Both solutions were heated to 70° C. before mixing. The mixture was stirred, filtered and twice washed with cold water, filtered after each washing. The precipitate was dried at 130° C. for 72 hours and heated in vacuo at 300°–340° C. for 20 hours. The analysis of the absorbent was as follows.

| Component: | Weight percent |
| --- | --- |
| Mn$_2$O$_3$ | 96.0 |
| Na$_2$O | 2.9 |
| SO$_3$ | 1.0 |

The absorbent was tested with simulated flue gas and the results are shown in Table 1.

EXAMPLE V

A 25-percent solution of manganese sulfate was electrolyzed at a potential of 5 to 6 volts and current densities of 4 to 14 amperes per square decimeter. The manganese oxide formed at the anode was washed twice with water, dried at 130° C. for 100 hours and then heated in vacuo at 300°–340° C for 20 hours. The precipitate at the cathode was washed with water, dried at 100° C., heated in air at 300° C. for 2 hours and in vacuo at 300°–340° C. for 20 hours. Analysis of the absorbent prepared from the precipitate at the anode was as follows.

| Component: | Weight percent |
| --- | --- |
| MnO$_{1.88}$ | 93.5 |
| S | 1.2 |

The absorbents were tested with the simulated flue gas and the results are shown in Table 1.

The contact of the manganese oxide absorbent with the waste gases may be accomplished by means of various well-known techniques such as fluidized, fixed bed or moving bed operations. With fixed bed operation several absorbers may be employed which are cyclically placed on stream and on regeneration so that uninterrupted operation may be obtained. The absorbent may be contacted in a reactor which allows free fall of solids or is provided with baffles to increase contact time.

The regeneration of the absorbent may be accomplished by a variety of processes as described above, i.e., by direct oxidation with chemical reagents such as ammonium persulfate, by anodic oxidation in an electrolytic cell or by indirect oxidation through the hydroxide by treatment with an alkali such as sodium hydroxide or by hydrolysis with a reagent such as sodium carbonate. The preferred method is indirect oxidation using sodium hydroxide.

In addition to sulfur dioxide there are very small concentrations of sulfur trioxide and sulfuric acid in flue gases and smelter gases as well as in the off gases from contact acid plants for the manufacture of sulfuric acid. These materials are readily removed by the manganese oxide absorbent.

The manganese oxide absorbent, although employed in a solid essentially nonaqueous phase as distinct from a slurry, may, as a practical matter, contain small amounts of water as it leaves filter press 15 and granulator 17. The amount of water may therefore range from substantially zero to an amount which renders the particles of manganese oxide slightly moist.

It will be understood that various changes and modifications may be made in the embodiments set forth above within the scope of the appended claims without departing from the spirit and scope of this invention.

What is claimed is:

1. A cyclic process for substantially complete removal of acidic oxygenated sulfur compounds from a hot flue gas which comprises contacting the hot gas with a solid absorbent material consisting essentially of manganic oxide containing water in an amount ranging from zero to an amount necessary to render the absorbent moist, thereby forming a spent absorbent comprising manganese sulfate; reactivating the spent absorbent by decomposing the manganese sulfate to reform manganic oxide absorbent; and recirculating the reformed manganic oxide absorbent for further use in contacting hot flue gas to remove acidic oxygenated sulfur compounds.

2. A cyclic process for substantially complete removal of acidic oxygenated sulfur compounds from a hot flue gas which comprises contacting the hot gas with a solid absorbent material consisting essentially of manganic oxide containing water in an amount ranging from zero to an amount necessary to render the absorbent moist, thereby forming a spent absorbent comprising manganese sulfate; treating the spent absorbent with sodium hydroxide solution to regenerate the manganic oxide absorbent and form a solution comprising sodium sulfate, electrolyzing the said solution to form sodium hydroxide and sulfuric acid as a by-product; and recirculating the reformed manganic oxide absorbent for further use in contacting hot flue gas to remove acidic oxygenated sulfur compounds.

3. The method of claim 1 in which the spent absorbent comprising manganese sulfate is reactivated by oxidation with ammonium persulfate.

4. The method of claim 1 in which the spent absorbent comprising manganese sulfate is reactivated by hydrolysis with sodium carbonate.

5. The method of claim 1 in which the spent absorbent comprising manganese sulfate is reactivated by electrolysis.

6. The method of claim 1 in which the spent absorbent comprising manganese sulfate is reactivated by treatment with sodium hydroxide.

7. The method of claim 1 in which the sulfur compounds comprise sulfur dioxide.

8. The method of claim 1 in which the flue gas is at a temperature of from 130° to 330° C.

References Cited in the file of this patent
UNITED STATES PATENTS

| | | |
|---|---|---|
| 1,304,222 | Van Arsdale et al. | May 20, 1919 |
| 1,770,791 | Libby et al. | July 15, 1930 |
| 2,822,243 | Brix | Feb. 4, 1958 |
| 2,956,860 | Welsh | Oct. 18, 1960 |
| 2,984,545 | Barbutton et al. | May 16, 1961 |
| 2,992,884 | Bienstock et al. | July 18, 1961 |
| 2,992,895 | Feustel et al. | July 18, 1961 |
| 2,997,368 | Barent et al. | Aug. 22, 1961 |

OTHER REFERENCES

Blumberg et al.: "Chemical Treatment of Low-Grade Manganese Ores: Conversion of Manganese Dioxide Into Manganese Sulphate," Journal of Applied Chemistry, vol. 3, part 5, May 1953, pages 223–233.

Bienstock et al., "Process Development in Removing Sulfur Dioxide From Hot Flue Gases," Bureau of Mines Report of Investigation 5735, 1961, 29 pages.

Pechkovsky: "Sulfating of Manganese Compounds by Sulfur Dioxide," J. Applied Chemistry (U.S.S.R.), 29:1067–70 (1956).